United States Patent
Hom et al.

(10) Patent No.: US 8,239,709 B2
(45) Date of Patent: Aug. 7, 2012

(54) MANAGING EXTRINSIC PROCESSES

(75) Inventors: Erwin Hom, Foster City, CA (US); Alex Chen, Saratoga, CA (US); Robert Parks, Castro Valley, CA (US); Jonathan Thatcher, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 2 days.

(21) Appl. No.: 12/540,254

(22) Filed: Aug. 12, 2009

(65) Prior Publication Data

US 2011/0041009 A1   Feb. 17, 2011

(51) Int. Cl.
G06F 11/00 (2006.01)
(52) U.S. Cl. .................................................. 714/38.1
(58) Field of Classification Search .............. 718/106
See application file for complete search history.

(56) References Cited

U.S. PATENT DOCUMENTS

| | | | |
|---|---|---|---|
| 6,593,940 B1 * | 7/2003 | Petersen et al. | 715/700 |
| 6,763,369 B1 * | 7/2004 | Ytuarte et al. | 709/201 |
| 6,938,255 B1 * | 8/2005 | Willems et al. | 718/104 |
| 7,017,082 B1 * | 3/2006 | Yip et al. | 714/38.1 |
| 7,159,211 B2 * | 1/2007 | Jalan et al. | 717/149 |
| 7,568,131 B2 * | 7/2009 | Vertes | 714/45 |
| 7,664,985 B2 * | 2/2010 | Ertel et al. | 714/15 |
| 7,681,181 B2 * | 3/2010 | Canning et al. | 717/127 |
| 7,823,021 B2 * | 10/2010 | Abe | 714/38 |
| 2002/0147856 A1 * | 10/2002 | Sarkar et al. | 709/313 |
| 2003/0120710 A1 * | 6/2003 | Pulsipher et al. | 709/106 |
| 2005/0155038 A1 * | 7/2005 | Morrison et al. | 719/310 |
| 2006/0239423 A1 * | 10/2006 | Archer et al. | 379/88.18 |
| 2007/0005936 A1 * | 1/2007 | Ortega | 712/1 |
| 2007/0220375 A1 * | 9/2007 | Baz | 714/55 |
| 2008/0059973 A1 * | 3/2008 | Verbowski et al. | 718/106 |
| 2008/0189717 A1 * | 8/2008 | Agarwal et al. | 718/106 |
| 2009/0106421 A1 * | 4/2009 | Kronenberg et al. | 709/224 |
| 2009/0132577 A1 * | 5/2009 | McArdle | 707/102 |
| 2009/0165132 A1 * | 6/2009 | Jain et al. | 726/22 |
| 2010/0223217 A1 * | 9/2010 | Little | 706/19 |

* cited by examiner

Primary Examiner — Robert Beausoliel, Jr.
Assistant Examiner — Neil Miles
(74) Attorney, Agent, or Firm — Fish & Richardson P.C.

(57) ABSTRACT

Methods, program products, and systems for monitoring extrinsic processes are described. A monitoring process can monitor one or more target processes. The target processes can be extrinsic, e.g., not spawned by the monitoring process. The monitoring process reads a process registry to identify which processes among multiple processes to monitor. The monitoring process can send status requests to the identified target processes periodically to check whether the target processes are healthy. If a target process is terminated, the monitoring process determines whether the termination is normal (e.g., by a user), or abnormal (e.g., the target process crashed). The monitoring process can restart the abnormally terminated or hung target process.

24 Claims, 12 Drawing Sheets

MANAGING EXTRINSIC PROCESSES

TECHNICAL FIELD

This disclosure relates generally to process management.

BACKGROUND

A complex software application can include multiple processes. For example, a master program can launch various component programs, monitor the component programs, and restart the component programs. Each of the component programs can also launch various sub-processes. The component programs and sub-processes can run on separate computers. The component programs and processes can have inter-dependency. In a conventional process management system, an operating system or a process management tool tracks the component programs and their processes. Existing operating systems or process management tools can determine a parent-child relationship between processes when the parent process spawns the child process (e.g., when the processes are "intrinsic" to each other). Processes that do not spawn one another (e.g., when the processes are "extrinsic" to each other) but are inter-dependent and run on separate computers can be managed manually.

SUMMARY

Methods, program products, and systems for monitoring extrinsic processes are described. A monitoring process can monitor one or more target processes. The target processes can be extrinsic, e.g., not spawned by the monitoring process. The monitoring process can read a process registry to identify which processes among multiple processes to monitor. The monitoring process can send status requests to the identified target processes periodically to check whether the target processes are healthy. If a target process does not produce a normal response, the monitoring process can determine whether the target process is terminated normally (e.g., by a user), or abnormally. If the target process has been terminated normally, the monitoring process does not need to restart the target process. Otherwise, the monitoring process can restart the abnormally terminated target process.

In some implementations, to avoid temporary network or operating system glitches, the monitoring process can make multiple confirmations before determining that a process is indeed terminated abnormally. For example, a target process can be non-responsive because the target process is hung (e.g., running but not responding) or crashed (e.g., not running). The target process can also be non-responsive because the network is temporarily busy. Multiple confirmations can be used to distinguish the two causes. The system can restart an abnormally terminated target process after multiple confirmations that the target process indeed terminated abnormally and not due to temporary network error. Automatically restarting a hung or crashed target process can enhance system availability.

In some implementations, the monitoring process can shutdown and restart processes dependent on the target process. The monitoring process can identify one or more dependent processes by reading a configuration file. In the configuration file, a hierarchy of process dependencies can be specified. Process dependency is not limited to parent processes and spawned child processes, but can include arbitrary processes defined by a user. The processes can be identified by tags assigned to the processes by a starting script.

In some implementations, a monitoring process running on one or more processors can identify a target process. The monitoring process can perform a status check on a target process, and determine whether the target process is in an abnormal state. If the target process is in an abnormal state, the monitoring process can increase a failure count of the target process. When the failure count reaches a threshold, the monitoring process can restart the target process.

In some implementations, identifying the target process can optionally include reading a process catalog from a deployment configuration file. Identifying the target process can optionally include tagging the target process at a time the target process is launched, and identifying the tagged process in an operating system as the target process. Performing the status check can optionally include making a status request to the target process. If the monitoring process fails to receive a response, the monitoring process can check a state indicator in a process registry. If the state indicator in the process registry indicates a current status that conflicts with the failure, the monitoring process can determine that the target process has been abnormally terminated.

The details of one or more implementations of managing extrinsic processes are set forth in the accompanying drawings and the description below. Other features, aspects, and advantages of managing extrinsic processes will become apparent from the description, the drawings, and the claims.

BRIEF DESCRIPTION OF THE DRAWINGS

Like reference symbols in the various drawings indicate like elements.

DETAILED DESCRIPTION

Monitoring Extrinsic Processes Overview

Figure 1A:
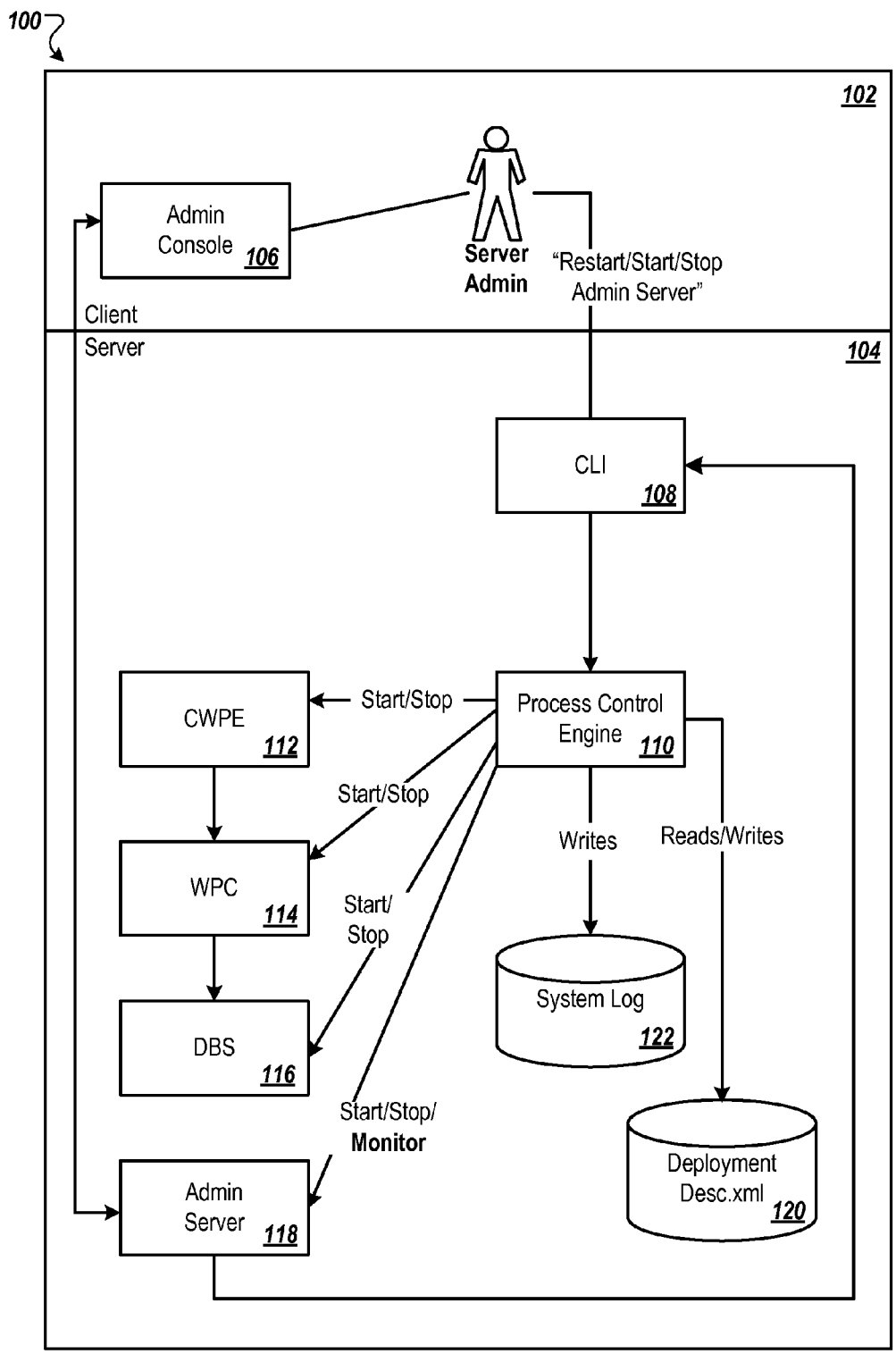
FIG. 1A is an overview of an exemplary system for monitoring extrinsic processes.

FIG. 1A is an overview of some exemplary implementations of monitoring extrinsic processes. For convenience, exemplary implementations will be described with respect to system 100 that performs the techniques for monitoring extrinsic processes, and a user using system 100.

Multiple processes can run on system 100. Among the processes, process control engine 110 can be a monitoring process. Process control engine 110 can monitor and manage target processes 106, 112, 114, 116, 118 that are not spawned by (and hence extrinsic to) process control engine 110. Process control engine 110 can determine which processes to monitor by reading process registry 120. If process control engine 110 determines that a target process (e.g., 112) has ended abnormally (e.g., crashed), process control engine 110 can restart the target process. Process control engine 110 does not have to restart a target process if the target process has terminated normally (e.g., by a proper shutdown command). Process control engine 110 can also write component status (e.g., whether a component is enabled or disabled, whether a module can be manually or automatically restarted, etc) into process registry 120

Process registry 120 can include a file stored on server 104 (e.g., a file in XML format having a name "deployment_desc.xml"). Process registry 120 can also have any other file format. The status written into process registry 120 can include, for example, a process identifier, a time at which the process is started, whether any error messages accompanied the starting of the process, etc.

System 100 can include client 102 and server 104. Client 102 can be a computer that uses services of server 104. Although conceptually distinct, client 102 and server 104 can run on a same computer. A user (e.g., a server administrator) can access, monitor, and manage various processes on server 104 from client 102. For example, the user can manage various processes through administration console 106. Administration console 106 can connect to an administration server component 118 through various interfaces (e.g., based on a Web interface). Administration console 106 can be served from administration server component 118 via an administration console startup user interface (e.g., a startup Web page). Administration console 106 can run on either client 102 or server 104.

Administration server component 118 can act as a controller of various processes. In a database backed Web publishing application, various engines need to work in synchronization to produce formatted data to an end user. The engines, when started, can run as processes on one or more servers 104. The database backed Web publishing application can include custom Web publishing engine (CWPE), which can support Extensible Stylesheet Language Transformations (XSLT) publishing and other functions, can run as CWPE process 112. Web publishing core engine (WPC), which can include a data engine that can work with various Web servers, can run as WPC process 114. A database server (DBS) can run as DBS process 116. These processes can be inter-dependent. For example, a first process can require a second process be running before the first process can be started. For example, WPC 114 and the process of administration server module 118 can each depend from DBS 116. CWPE process 112 can depend from WPC process 114, etc. However, it is not necessary that one of the processes spawn another one. For example, the processes 112, 114, 116, and 118 need not be recognized by an operating system to be in one process tree.

In some implementations, administration server component 118 can start and stop processes 112, 114, and 116. In starting and stopping processes 112, 114, and 116, administration server module 118 can communicate with process control engine 110 through command-line interface 108.

The user can use administration server module 118 to monitor processes 112, 114, and 116. Administration server module 118 can check the status of processes 112 114, and 116 by communicating to the processes through designated ports of the processes, using functions provided by an operating system (e.g., the "ps" function in UNIX like environment), or using information written in process registry 120.

The user can use command-line instructions to manage various processes 112, 114, 116, and 118. The user can use command-line interface 108 to access process control engine 110. The command-line instructions are not limited to conventional operating system level commands (e.g., UNIX shell commands "fg," "bg," "kill pid," etc.). Rather, the command-line instructions can include commands to start, stop, or restart a process by name (e.g., "sa_cli start adminserver" or "sa_cli autorestart adminserver on").

Administration server module 118 can be used to monitor other processes 112, 114, and 116. However, administration server module 118 itself is also a process that needs to be monitored. In some implementations, process control engine 110 can automatically monitor administration server module 118, using process registry 120. In some implementations, a user can decide to monitor processes 112, 114, and 116 automatically (e.g., without using administration console 106). In such cases, process control engine 110 can monitor administration server module 118 as well as other processes 112, 114, and 116.

Once started, process control engine 110 can identify currently running processes to monitor. Multiple processes (e.g., operating system processes, user processes, and server processes) can be running on server 104 at any given time. Process control engine 110 needs to identify which processes should be monitored. The processes to be monitored can be identified using process registry 120, which can keep process information. Processes 112, 114, and 116 can be started manually (e.g., by a command line input in a shell) or automatically (e.g., by a parent process). When a process (e.g., 118) is started, either the process itself or its parent process can write an entry into process registry 120. Process registry 120 can differ from a log file because entries in process registry 120 can be removed. For example, when a process ends normally, the entry corresponding to the process can be removed according to the exiting procedures in the process.

Process control engine 110 can periodically check process registry 120 for processes to monitor. If process control engine 110 identifies process 118 in process registry 120, process control engine 110 can perform a status check on the identified process. When the status check fails, process control engine 110 can try to restart process 118. Process control engine 110 can be configured to store detected failures, command-line instructions to start or stop a process, and automatic start or stop a process in system log file 122.

Figure 1B:
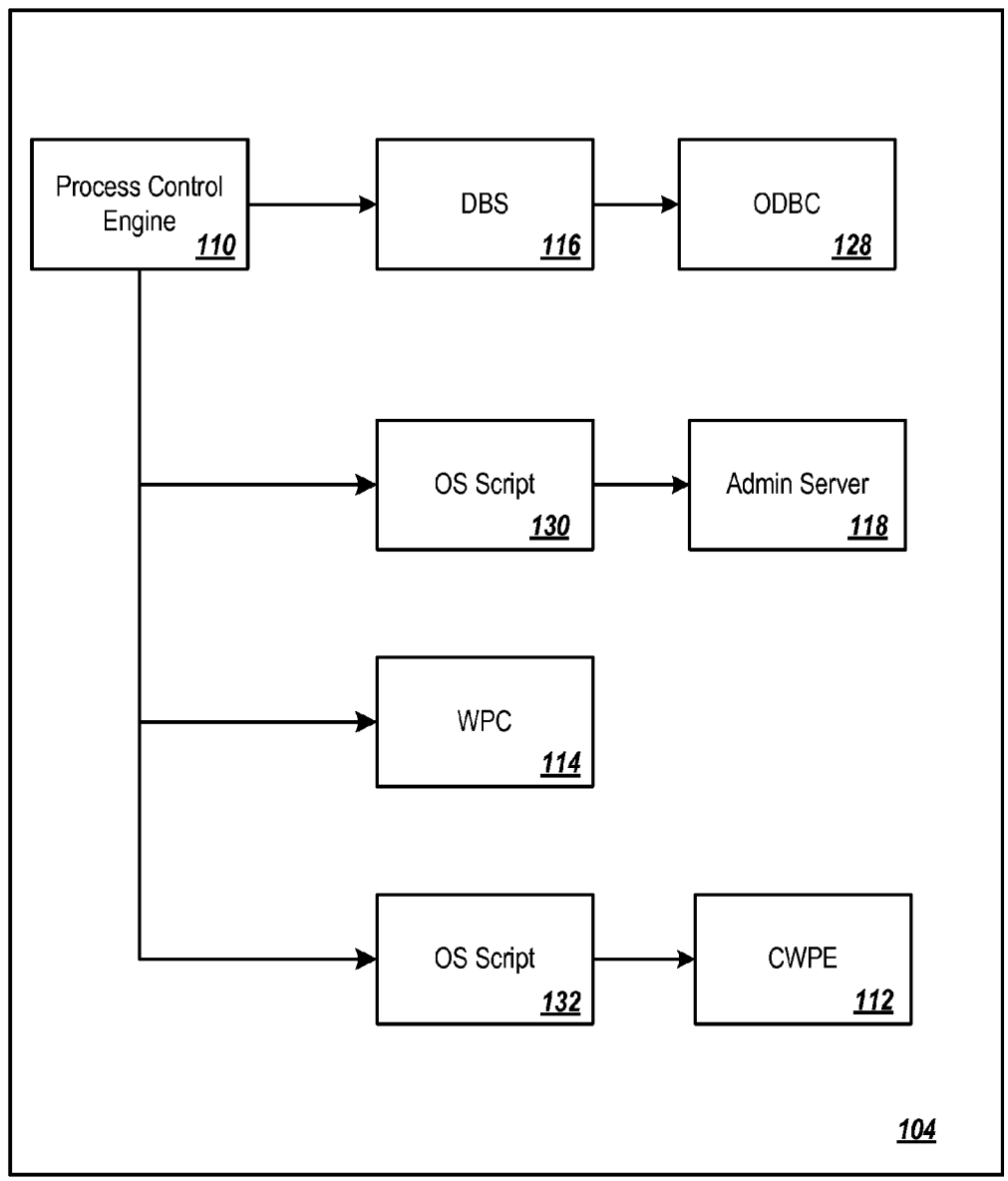
FIG. 1B is a block diagram illustrating exemplary inter-relationships among components of FIG. 1A.

FIG. 1B is a block diagram illustrating exemplary inter-relationships among components of FIG. 1A. In server 104, process control engine 110 can communicate with DBS 116. DBS 116 can communicate with its Open Database Connectivity (ODBC) component 128. In this example, process control engine 110 is not managing ODBC component 128. However, in some implementations, process control engine 110 can be configured to manage ODBC component 128. For example, although process control engine 110 does not directly start up ODBC component 128, process control engine 110 can ensure that ODBC component 128 is terminated if the DBS has been stopped. This can happen, for example, during deployment shutdown. This behavior can be specified in process registry 120.

Process control engine 110 can communicate with administration server 118 using operating system script 130. Operating system script 130 can include functions that annotate administration server 118. Annotation of processes will be described below in further details.

Process control engine 110 can similarly communicate directly with WPC 114, and communicate indirectly with CWPE 112 through operating system script 132. Communication between process control engine 110 and various components 112, 114, 116, and 118 can include status checks, shutdown commands, and restart commands.

Tracking Processes for Monitoring

Using a first process (e.g., a monitoring process) to manage a second process (e.g., a target process) requires that the first process knows which processes among many operating system processes to monitor and manage. If a target process is spawned (e.g., created) by the monitoring process, the monitoring process can remember the target process. However, if the target process is extrinsic (e.g., spawned by another process), the monitoring process needs to somehow find it. "Finding" or "identifying" a target process can include acquiring a process ID of the target process.

In some implementations, identifying a target process can include acquiring the process ID of the target process by searching the process using a process name. Tracking a process by name can include retrieving a command that started the process by using operating system utilities (e.g., "ps" in UNIX-like environment). However, in various operating systems, the operating system utilities can return only a portion of the command. Other portions of the command (e.g., characters in the command that exceeds a particular limit, and some or all of command-line arguments) are not returned.

Moreover, some parameters and flags used in launching the application cannot be easily tracked. For example, an exemplary application program my_app.exe can accept various program arguments. However, operating system or shell-reserved command-line options are not visible to the application program.

For example, a target process can be a Java program launched by a Java Application Launcher (e.g., java.exe). A command that created the process using java.exe can include a long path, for example:
/System/Library/Frameworks/JavaVM.framework/Versions/1.5/Home\/bin/java.exe/home/users/apps/my_project/classes/MyApp.java If the monitoring process uses an operating system utility to identify the target process, at this point the monitoring process may not know what target process is running even if the operating system can retrieve the entire path, because the name of the process to be monitored can be a parameter of the "java" process.

The problem can be solved in various implementations. In some implementations, system 100 can utilize process registry 120 to track the processes. Process registry can be a file stored on a storage device (e.g., a file system) in various computer-readable formats (e.g., Extensible Markup Language (XML) format).

Each entry in process registry 120 can include information such as process name (e.g., "AdminServer"), starting parameters (e.g., path, options, arguments), environmental variables set (e.g., by "setenv" function), and messages from either the parent process or the process being started (e.g., warning messages or success messages).

Process registry 120 can be updated and read by various processes. For example, one or more administration server modules 118 can read from or write to process registry 120, whereas process control engine 110 can read from process registry 120. To ensure that process registry 120 is in a consistent state, a locking mechanism can be implemented to preserve the integrity of process registry 120. In some implementations, the locking mechanism can be an atomic operation. For example, a "mkdir/tmp/lock" and "rmdir/tmp/lock" pair can serve as a lock and unlock mechanism. A process updating process registry 120 can hold when/tmp/lock is in existence.

In some implementations, to enter a process into process registry 120, an operating system (OS) script can be used to start a process. Instead of starting a process directly (e.g., by invoking a .exe file), the system can invoke an OS script file (e.g., .bat or .sh). The OS script file can perform various processing before the process is launched. For example, environment variables can be set, as well as parameters and options of the process.

In some implementations, an identifier (e.g., a tag) in the command line can be used to track the process. In a UNIX-like environment, process can be located using a ps command in conjunction with a grep command. For example, in some implementations, the following command can return processes running under JVM using Java application launcher (java.exe):

ps -A -o pid,user,command|grep java|grep -v grep

However, when many processes are running under java.exe, determining which process is a target process can be difficult because "grep java" can return every one of them. The difficulty is even more pronounced when the executables of the processes have the same name. This can happen, for example, when two administration server modules 118 are started, or when multiple WPC processes 114 are started. When one parent process crashes, the system needs to identify the particular process's child process to restart. However, because multiple parent processes and multiple child processes can have the same respect names, a "grep" in itself cannot distinguish which child process to shut down.

Therefore, in some implementations, the system can annotate the processes by giving each process a unique tag that a monitoring process can use to identify the process. When the process is a java process, the system can use a special option to set the unique tag. In some implementations, a "-D" option can be used. A conventional java application launcher launches a process in the following exemplary format:

java [options] class [argument]

To annotate a particular process, the system can utilize the "-Dproperty=value" option, which sets a system property value. The "-D" option can be overloaded. Instead of setting a system property value, the "-D" option can be used to set a tag. A tagged process can be launched using the following exemplary format:

java-DSYS.COMPONENT=cwpe [other options] class [argument]

In the above example, the process launched is tagged with string "SYS.COMPONENT=cwpe" and can be identified by the operating system and monitoring process using the tag later. Any Java application can be tagged. For example, CWPE 112, WPC 114, DBS 116, administration server 118, and administration console 106, all of which can be Java application, can be tagged with various strings. If one of the processes (e.g., administration console 106) runs on a remote machine (e.g., client 102), process control engine 110 can manage the remote process using remote access tools (e.g., secure shell, SSH), as long as a configuration file (e.g., process registry 120) identifies the host (e.g., client 102) of the remote process.

In various implementations, the tag can also include an instance name, which can be used to track multiple instances of a same component running concurrently. The tag can include an instance identifier for identifying the various instances. For example, the following commands can be used to track the first and second instances of WPC 114:

java -DSYS.COMPONENT=wpc:1 [other options] class [argument]

java -DSYS.COMPONENT=wpc:2 [other options] class [argument]

in which the ":1" and ":2" suffixes can be added by a script automatically, depending on the order in which the two WPC processes are launched.

Exemplary Processes for Monitoring Extrinsic Processes

Figure 2:
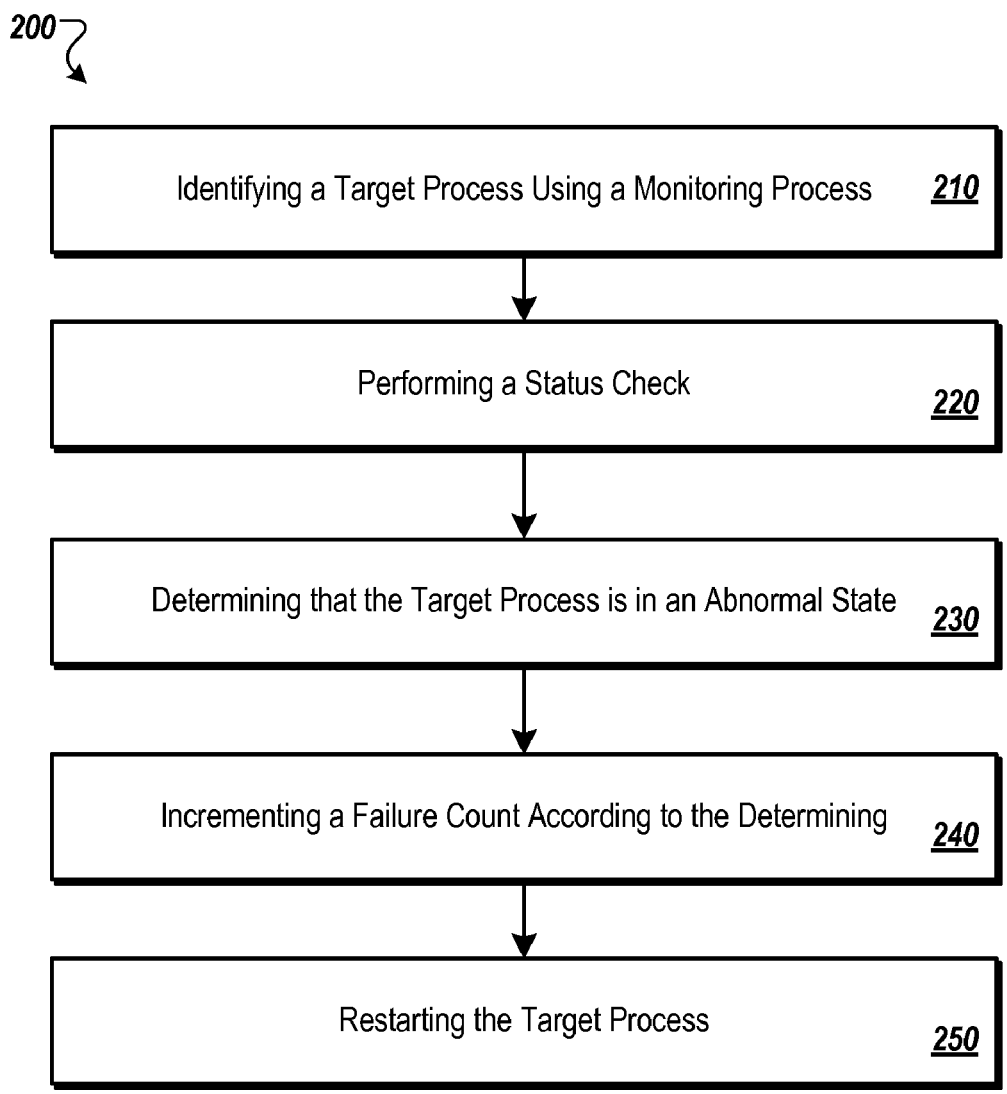
FIG. 2 is a flowchart illustrating an exemplary process for managing extrinsic processes.

FIG. 2 is a flowchart illustrating an exemplary process 200 for monitoring extrinsic processes. For convenience, the exemplary implementations will be described with respect to a database reporting system that performs the techniques, and a user using a database application program.

A monitoring process can identify (210) a target process on one or more servers. Identifying the target process can include determining which process to manage among many processes running in an operating system. In some implementations, identifying the target process can include reading from a process registry (e.g., 120). The process registry can include status information of currently running processes (e.g., processes 112, 114, and 116, etc.).

In some implementations, identifying the target process can include identifying specially tagged processes in the operating system. At time the target process is launched, the target process can be tagged with identifying information. When the target process is a java application running in JVM, the target process can be tagged using one or more "-D" options. The "-D" option can specify a variable value that corresponds to a process name (e.g., "cwpe") or ID (e.g., an ID of the parent process). On UNIX-like systems, the monitoring process can use a "grep" utility on the process name or ID to identify processes to monitor.

The monitoring process can perform (220) a status check on the target process. A status check can determine whether the target process is healthy. The status check can be repeated at user-configurable intervals (e.g., every minute, every 5 minutes, etc.). In some implementations, checking the status of a process can include sending a Hypertext Transfer Protocol (HTTP) request to a particular port used by the process. For example, to perform a status check on administration server module 118, the monitoring process can use the following exemplary URL:

http://localhost:16000/adminserver/?-guid=123&-status

In some implementations, performing a status check can include providing a test input to the target process and examine whether a desired result is provided. For example, if a target process routinely consumes files from an input directory (e.g., reads and deletes files after read), the monitoring process can put a monitoring input file in the directory and see if an result corresponding to the input (e.g., an output file, a web page, or an email) is correctly generated.

The monitoring process can determine (230) whether the target process is in an abnormal state. This can be done by examining a response to the status request or examining the result corresponding to the test input. For example, when the status check is an HTTP request, the check result can be an HTTP response. The following exemplary response can indicate that administration server module 118 is in a normal state:

```
<AdminServer version="1.0">
    <upsince="07/09/2009 5:00 PM"/>
    <error code="0"/>
</AdminServer>
```

If the monitoring process does not receive a response after a pre-determined time-out period (e.g., 20 seconds), or if the monitoring process does not receive a response whose error code is not "0," the target process can be in an abnormal state. Some exemplary causes of abnormal state can include process overload, crash, network glitch, hardware failure, etc.

Status check on various processes can be performed in sequence or concurrently. Sequential status checks can include sending a next status check after receiving a response. Concurrent status checks can include sending multiple status checks to multiple target processes simultaneously, each using a separate thread or process.

When the monitoring process feeds a test input to the target process, the monitoring process can determine (230) whether the target process is in an abnormal state by examining a result generated by the target process based on the input. In some implementations, examining the result can occur asynchronously with the status check. For example, the result can be saved as files in a pre-designated directory. A separate helper process can periodically check the directory and the files and determine if all result is returned, and the returned result is correct. If one monitoring process is monitoring many target processes, each target process can have its own output directory. Alternatively, each result can include an identifier of the process generating the result. Asynchronous result checking can have several advantages. For example, asynchronous result checking can be more efficient when network latency is long and many target processes need to be checked.

The monitoring process can increase (240) a failure count based on the determination. One single failure to respond to status request does not necessarily suggest that the target process has failed. Therefore, instead of immediately shutting down or restarting a target process when the target process is in an abnormal state, the monitoring process can increment a failure count. The monitoring process can use a counter for each target process that has an abnormal state. Each time when the monitoring process detects an abnormal state, the counter can be incremented by one. If a next status check on the target process returns a normal response, the counter can be decremented by one until the failure count reaches zero. Therefore, for example, if a specific target process has a failure count of two, the monitoring process can require two normal responses to complete clear the failure count for the process. Each target process can have a separate counter.

The monitoring process can restart (250) the target process when the failure count reaches a threshold. If a target process repeatedly fails to respond to a status request correctly, it is likely that the target process has permanent and fatal errors. Therefore, a threshold can be specified for the system (e.g., in a configuration file). If the target process fails to respond to a status request for a number of times (e.g., three times), the monitoring process can assume that the target process has errors.

In some implementations, the failure threshold is defined at the target process. The target process can respond to a status check request with a "normal" response even when some errors occur and are registered by the target process. When a predetermined number of errors have occurred, the target process can respond with an error code.

Figure 3A:
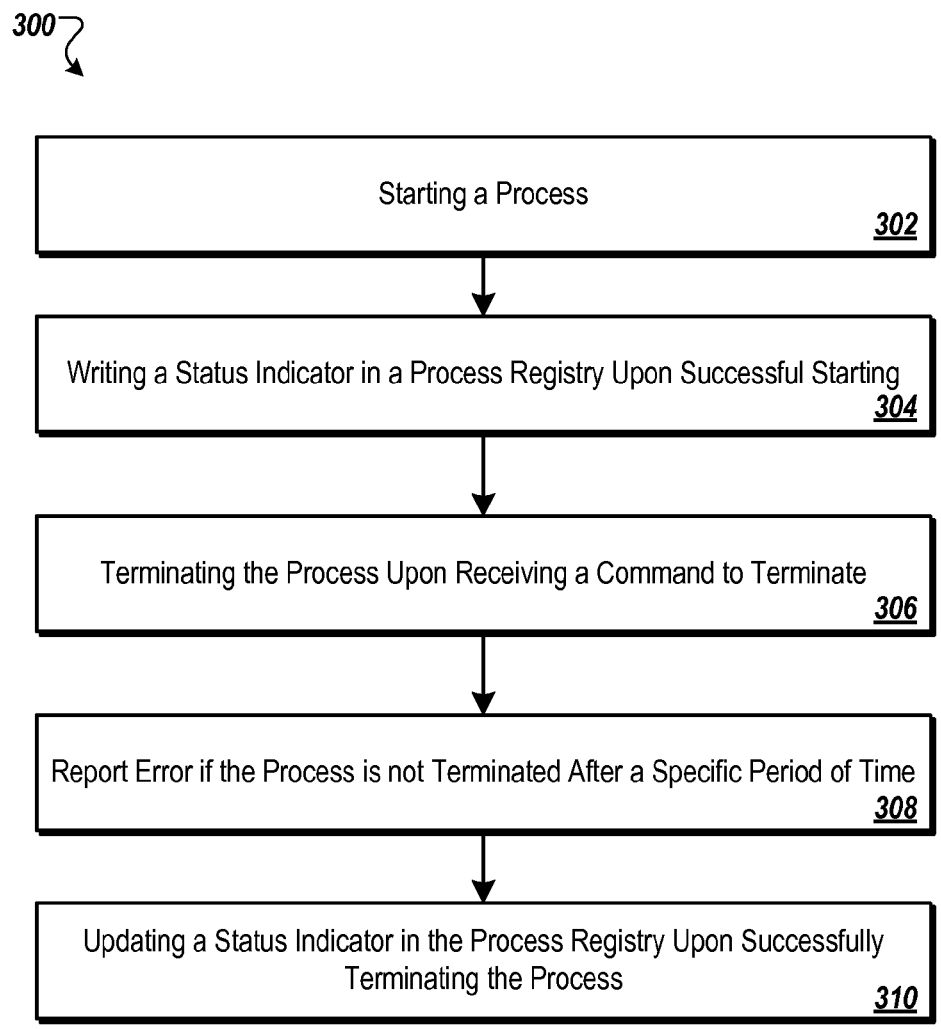
FIG. 3A is a flowchart illustrating an exemplary process for registering a process to be monitored.

FIG. 3A is a flowchart illustrating an example process 300 for registering a process to be monitored while starting the process. In some implementations, starting the process can include running an OS script that performs operations that will be described below.

A system can start (302) a process as a component of an application program. Although it is possible that a monitoring process starts the process, it is not necessary that the monitoring process start the process. The system can write (304) a status indicator in a process registry upon successfully starting the process. Thus, the process registry can contain all currently running processes.

The system can terminate (306) the process upon receiving a command to terminate. The command can be received using a command line interface, a Web interface, an API, or a scheduled event. For example, a process can be rotated (e.g., shutdown and restarted) periodically by configuration. Terminating the process can include running a shutdown script.

The system can report (308) an error if the process is not terminated after a specific period of time. If the process has been successfully terminated, the system can update (310) a status indicator in the process registry. Updating the status indicator can include, for example, marking the process as terminated. Thus, a monitoring process reading the process registry will not perform status checks on the process.

Figure 3B:
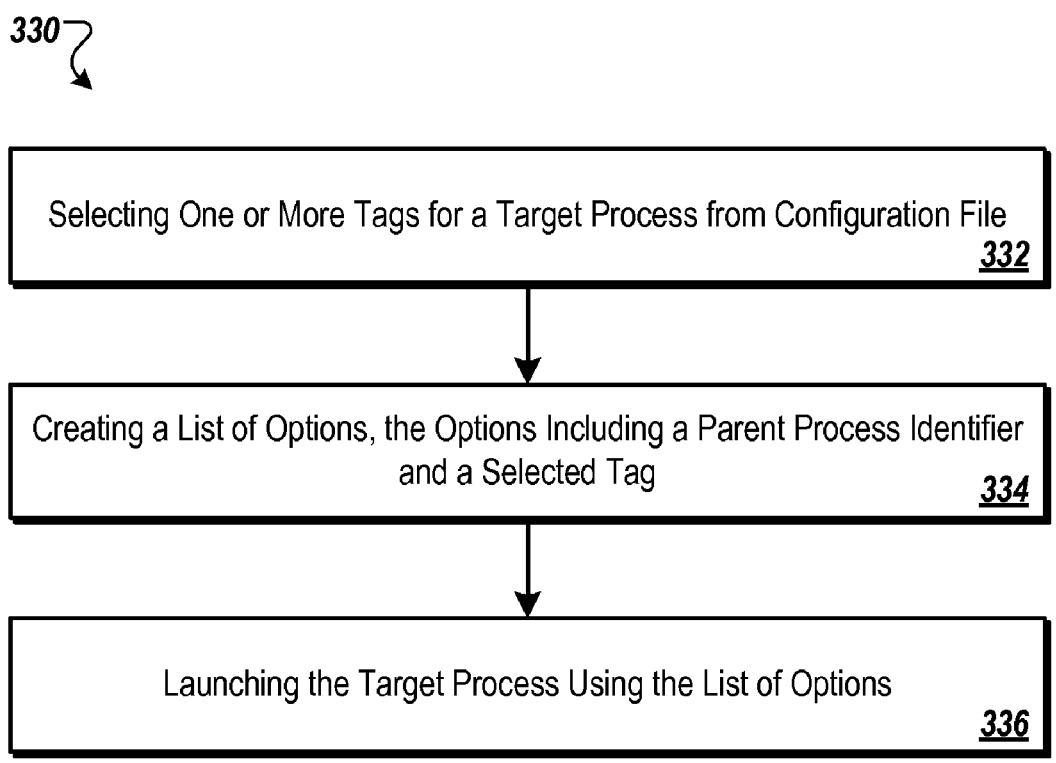
FIG. 3B is a flowchart illustrating exemplary processes for tagging a target process.

FIG. 3B a flowchart illustrating exemplary process 330 for tagging a target while starting the process. In some implementations, starting the process can include running an OS script that performs operations that will be described below.

A system can select (332) one or more tags for a target process from a configuration file. Each component (e.g., CWPE, WPC, or DBS) of an application program can have a unique identifier (e.g., "cwpe," "wpc," or "dbs"). The configuration file can also specify a dependency hierarchy (e.g., "wpc: adminserver" and "cwpe: wpc"). The dependency hierarchy can be used for identifying dependent processes when a parent process is started or shut down. In some implementations, the process dependency can have a tree structure. The process dependency tree can differ from the conventional process dependency tree in an operating system, because the processes specified in the dependency hierarchy need not be spawned by one another. Therefore, the configuration file can be used to specify dependencies arbitrarily, based on a programmer's need. The system can select a tag based on what process the system is launching.

The configuration file can be a part of process registry 120. The configuration file can also be a file that is distinct from process registry 120. For example, the configuration file can be a file having the following format (where "commands" can include one or more commands the system can perform at the launching of the process), and process A is dependent on both process B and process C:

| # Comments | |
|---|---|
| [host/]process A: | [host/] process B; process C commands |

The system can create (334) a list of launching options. The options can include the selected tag. Launching options can be command-line options for launching a process and can differ from arguments for the processes. For example, when launching a process in Java, the command can be java [options] class [argument . . . ]. The [options] are command-line options; the class can be a name of the class to be invoked; and the argument can be arguments passed to a "main" function of the class. In some implementations, the option can include a specific system variable name (e.g., "SYS.COMPONENT") and the tag.

The system can launch (336) the target process using the options. For example, the system can use a Java application launcher to start the target process, as described above.

Figure 3C:
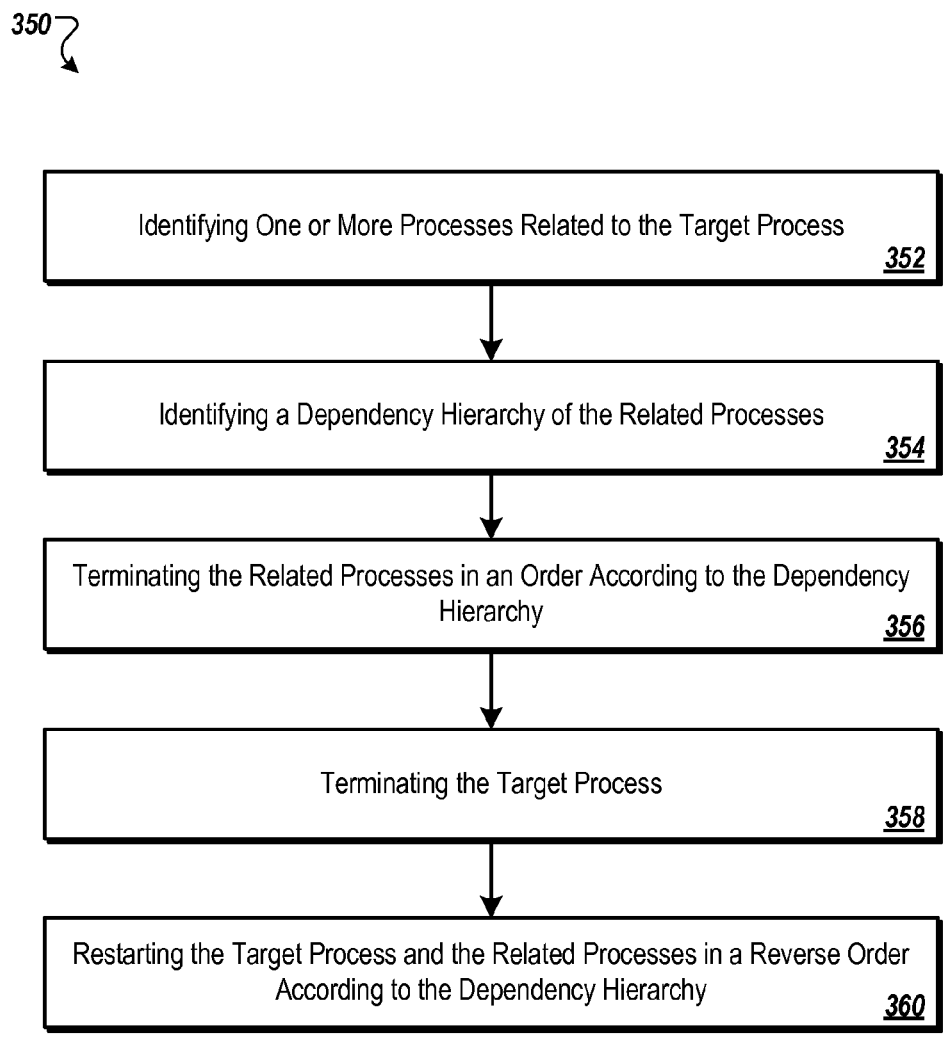
FIG. 3C is a flowchart illustrating an exemplary process for restarting a target process.

FIG. 3C is a flowchart illustrating an exemplary process 350 for restarting a target process. The system can identify (352) one or more processes related to the target process. Identifying the target process can include reading process registry 120 or using OS utilities (e.g., grep), or both, to identify the related processes. A process can be related to the target process if the process is a parent or child of the target process according to the OS (e.g., the process spawned the target process or the target process spawned the process). A process can also be related to the target process if it is specified in a configuration file as such, e.g., when a logical relationship exists. An example of a logical relationship is a database program A running on computer X, and a Web publishing program B, which uses the services provided by A, running on computer Y. Although program A and program B need not be spawned by one another in the OS, they can be specified as related in the configuration file. If database program A needs to be restarted, Web publishing program B may also need to be restarted.

The system can identify (354) a dependency hierarchy of the related processes. Identifying a dependency hierarchy can include two parts: identifying which process depends from which, and identifying all running processes that depend from a particular one according to the hierarchy.

The system can use the configuration file to determine which processes depend on which other processes by resolving process dependency hierarchy in the configuration file. For example, in a configuration file, the following entries can be used to define a hierarchy in which administration server module 118 depends from DBS 116; WPC 114 depends from administration server module 118; and CWPE 112 depends from WPC 114:

adminserver: dbs
wpc: dbs
cwpe: wpc; dbs

In another example configuration file, process WPC can run on a remote computer ("first_computer"):

adminserver: dbs
first_computer/wpc: dbs
cwpe: first_computer/wpc; dbs

If parallel definitions are specified (e.g., a second "first_computer/wpc: dbs"), they can be ignored. If circular definitions are specified (e.g., "dbs: wpc"), an error message can be provided.

To identify all running processes that depend from a particular one, the system can identify a tag of the processes (e.g., "cwpe") dependent from the target process (e.g., "wpc") by analyzing the configuration file. The system can search process registry 120 or use the OS utility for the tagged processes.

The system can terminate (356) the related processes in an order according to the dependency hierarchy. For example, when the target process is administration server module 118, the system can terminate all CWPE processes, then all WPC processes. In some implementations, more than one instance of administration server module 118 can be running on the system. In such cases, the related dependent processes CWPE and WPC need not be terminated, if other administration server module 118 can take over control (e.g., through load balancing). However, if the target process is the last running instance, or if a load balancing mechanism cannot re-route the control, the system can still terminate the related dependent processes CWPE and WPC.

The system can terminate (358) the target process. Terminating the target process can include running an OS script that performs various pre-termination and post-termination tasks (e.g., updating process registry 120), as described above.

The system can restart (360) the target process and the related processes in a reverse order according to the dependency hierarchy. In some instances, more than one instance of each dependent process can be restarted when more than one instance of each dependent process has been terminated. For example, if the target process is a DBS process, multiple dependent processes running on multiple servers can be affected when the DBS process is terminated. The system can remember the multiple processes and servers, and restart the processes on the servers.

Figure 3D:
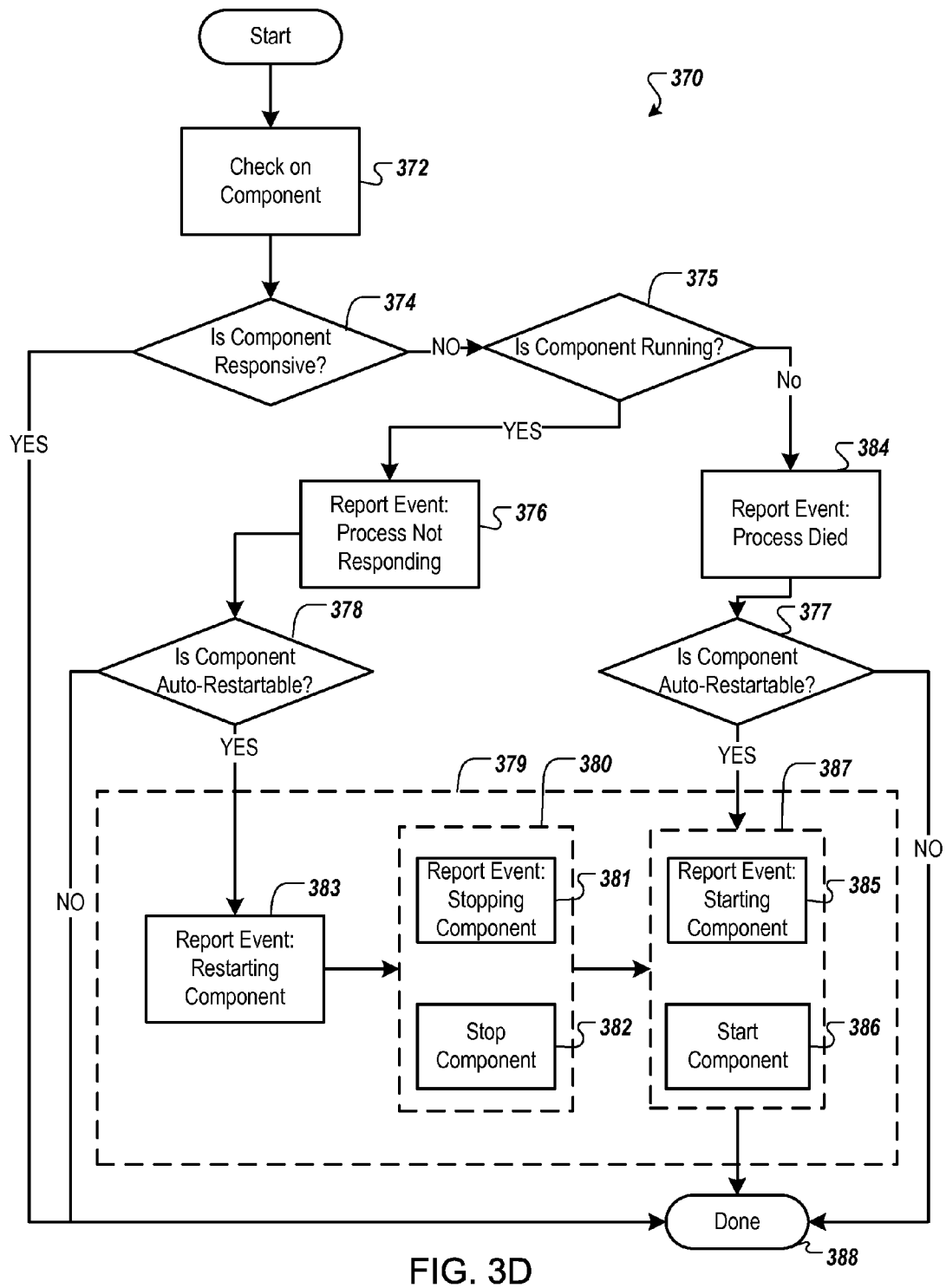
FIG. 3D is a flowchart illustrating an exemplary process for identifying and restarting a component of an application program.

FIG. 3D is a flowchart illustrating an exemplary process 370 for identifying and restarting a target component of an application program. In some implementations, process 370 can be a process that runs as a system process (e.g., "root" process in a UNIX-like environment) in the background. In some implementations in a MS Windows environment, process 370 can be a process that runs as a Windows Service (e.g., with a name "System Launcher"). In such cases, process 370 can handle Windows System Events (e.g., SERVICE_STOP, POWER_SHUTDOWN, etc.).

A system can examine (372) the target component. The target component can be a process (e.g., process 112, 114, 116, or 118) specified in process registry or a process tagged to be monitored. Examining the target component can include sending a status request to the target component. In some implementations, manually terminated components are excluded from examination from process 370.

The system can determine (374) whether the target component is responsive. Determining whether the target component is responsive can include waiting for a pre-determined time period (e.g., a time-out period) for a response of the status request, or examining content (e.g., an error code) of the response (if any). If an error code is returned, the system can determine a status of the component using the error code. The determination can be made by analyzing the error code, e.g., by comparing the error code to a reference error database. If the target component is responsive, process 370 can terminate or move to examine a next target component (388).

If the target component is non-responsive, the system can determine (375) whether the target component is running. The determination can be made by checking whether a process identified as the target component exists in the operating system. The process can be identified as the target component through annotation. Checking whether the process is running can include using operating system provided utilities to determine whether the identified process exists.

If the target component is running, but is irresponsive to a status check, the system can report (376) an event that the component is not responding. The event can include a nature of the non-responsiveness. For example, the event can specify that no response has been received after a time out period, that an error code is included in the response, or that a result from the target process is incorrect. Reporting the event can include writing an entry in system log file 122. In some implementations, reporting the event can include sending information in the response to an OS event handler The system can determine (378) whether the process can be automatically restarted (i.e., auto-restartable). A user can configure the system to restart some or all components of the application program automatically. The configuration can be stored, for example, in the "commands" section of a configuration file. The configuration can be performed using a command line tool, or by directly editing the configuration file. If the component cannot be automatically restarted, the system can opt to do nothing. Process 370 can terminate or move on to examine a next component (388).

If the component can be automatically restarted, the system can enter a restart state 379. The system can report (383) an event that the target component is going to be restarted. The system can enter a stop component routine 380, in which the system can report (381) an event that the component is being stopped. The system can stop (382) the component before, during, or after the stopping component event has been logged. Stopping the component can include stopping dependent processes as described above with respect to FIG. 3C. Stopping the component can also include running an OS script that performs various tasks associated with terminating a process.

The system can enter a start component routine 387, in which the system can report (385) an event that the target component is being started. The system can start (386) the target component before, during, or after the starting component event has been logged. Starting the target component can include starting one or more dependent processes as described above with respect to FIG. 3C. Starting the component can also include running an OS script that performs various tasks associated with terminating a process.

If the system determines (375) that the target component is not running, the system can report (384) an event that the process of the target component has died. The system can determine (377) whether the target component can be automatically restarted. The determination can be similar to stage 378, as described above. If the target component can be automatically restarted, the system can directly enter the start component routine 387. Otherwise, process 370 can terminate or move to a next component (388).

Process 370 can be repeated for each component specified in process registry 120. Furthermore, process 370 can be repeated at pre-determined intervals. Each repetition of process 370 can include reading process registry 120 to identify a next component.

In some implementations, determining whether the component is automatically restartable (stages 377 and 378), stopping a component (stage 382), and starting a component (stage 384) can be made optional. If an automatic restarting process feature of the system is turned off (e.g., by a "sa_cli autorestart adminserver off" command), process 370 can terminate or move to a next component (388) after reporting (384) a "process has died" event or reporting (376) a "process not responding" event.

In some implementations, the system can implement a mechanism for handling inconsistencies caused by response delay in status checking. When synchronized status checks are performed (e.g., the system receives a respond or time out before a status check for a next component is sent), inconsistency can exist between content of process registry 120 when process 370 first read process registry 120 and the content at time the status check is performed. For example, process 370 can read process registry 120 and determine that there are three components to monitor. The status checks for both first and second component can fail by time out. When the time out period is set to 20 seconds, the system will send status check for the third component 40 seconds after reading process registry 120. During the 40 seconds, the third component may have been terminated normally (e.g., manually). In this scenario, a status check on the third component is not necessary. Therefore, in some implementations, the system can read process registry 120 immediately before sending the status request to the third component. In some alternative implementations, the system can send the status request to the third component, and confirm the result with process registry 120 when a time out occurs.

Figure 3E:
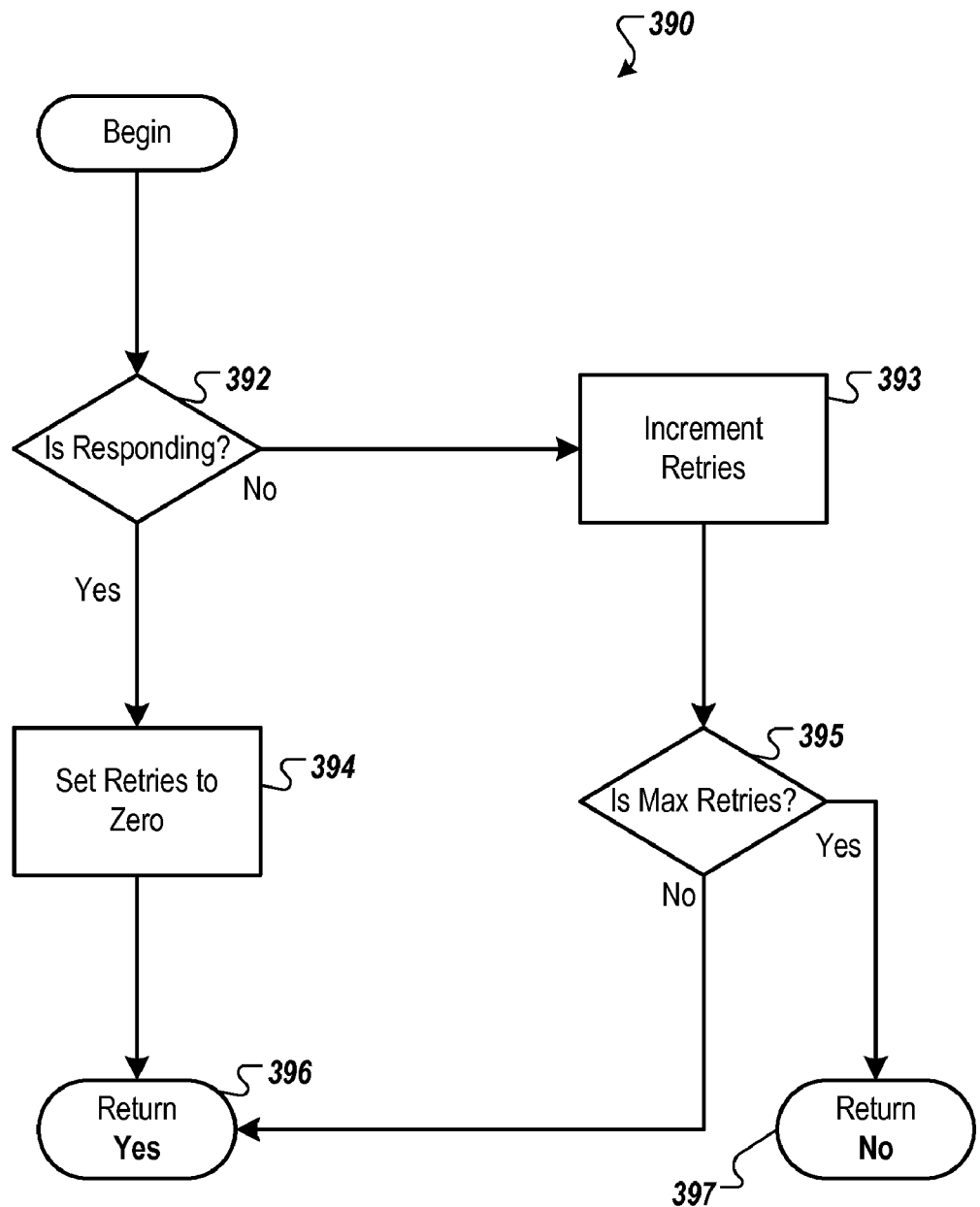
FIG. 3E is a flowchart illustrating an exemplary process for identifying an abnormal process of an application program.

FIG. 3E is a flowchart illustrating an exemplary process 390 for identifying an abnormal process of an application program. Process 390 can be run periodically by a monitoring process on every target process to be monitored.

In some implementations, the monitoring process can send a status check request to determine (392) whether a target process is responding. If yes, the monitoring process can set (394) a number of retries to zero. The number of retries can be a counter used to track how many times the target process has failed a status check request. The monitoring process can return (396) a value indicating that the target process is running normally.

If the target process is not responding, the monitoring process can increment (393) the number of retries. The monitoring process can determine (395) whether a maximum number of retries has been reached. The maximum number of retries can be a configurable threshold for controlling a sensitivity of the monitoring process. If the maximum number of retries has been reached, the monitoring process can return (397) a value indicating that the target process is not running normally. Otherwise, the monitoring process can return (396) the value indicating that the target process is running normally.

Exemplary Monitoring Engine

Figure 4:
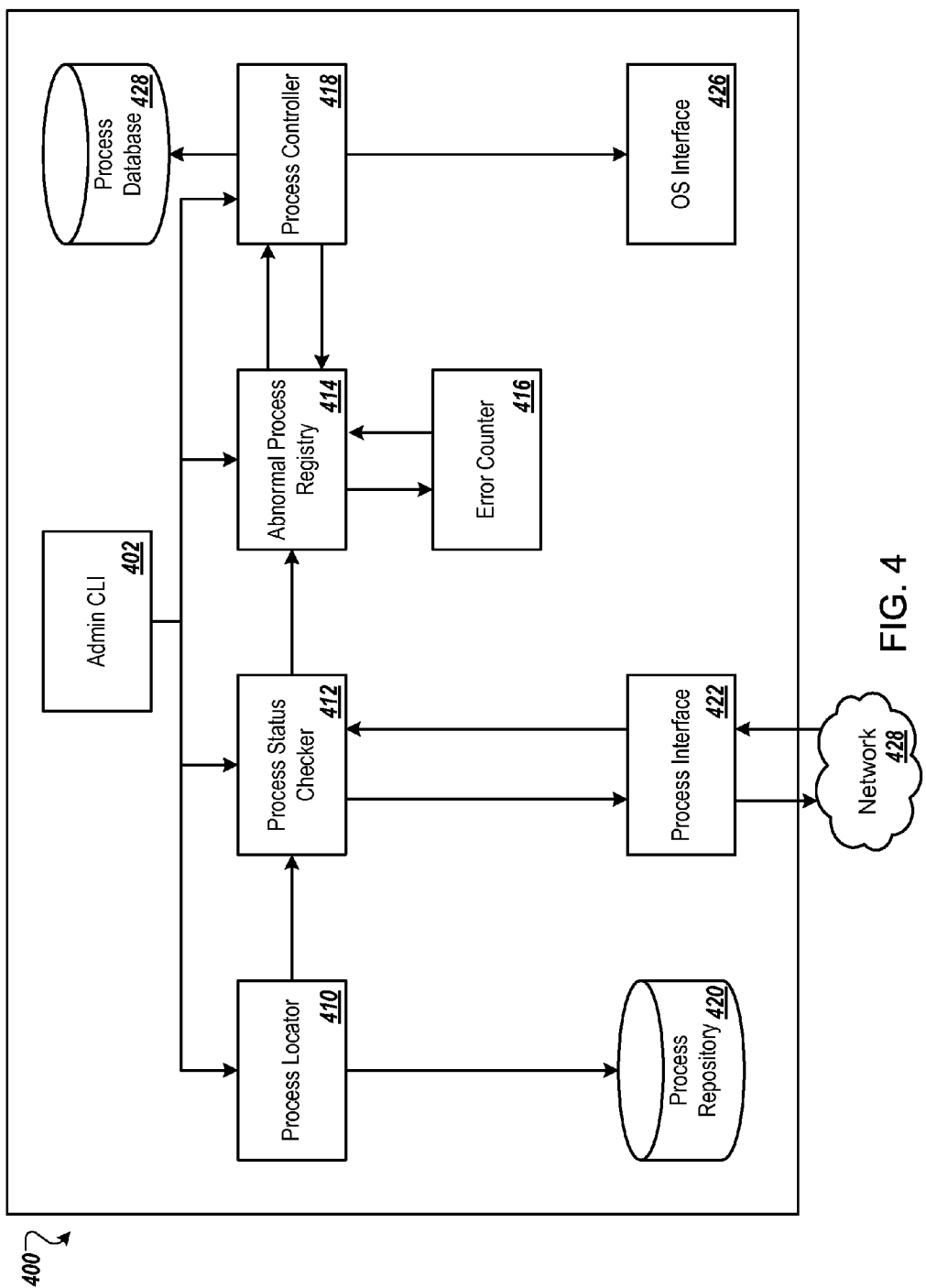
FIG. 4 is a block diagram illustrating an exemplary process control engine for monitoring extrinsic processes.

FIG. 4 is a block diagram illustrating an exemplary process control engine 400 for monitoring extrinsic processes.

Process locator 410 can identify which process to monitor. To identify target processes, process locator 400 can consult process repository 420. Process repository 420 can include one or more process registries 120. Process repository 420 can also include a dynamic process that examines processes tagged for monitoring using an OS utility.

Process locator 410 can pass a process ID of the identified target process to process status checker 412. Process status checker 412 can be responsible for controlling various status checking methods for various components. For example, to check a DBS component, process status checker 412 can generate a database query (e.g., a SQL statement); to check a Web service, process status checker 412 can generate an HTTP request; to check a file processing service, process status checker 412 can visit a specified directory, etc.

Process status checker 412 can check the status of the identified target process through process interface 422. Process interface 422 can contain various interfaces that correspond to the processes to be monitored. For example, process interface 422 can include an ODBC interface for sending database queries and receiving results, a Web interface for sending HTTP requests and receiving responses, and a password-less remote shell interface for logging to a remote file system to check file directories without requiring a user to enter a password.

Process interface 422 can communicate with local target processes, or remote target processes through network 428. Process interface 422 can include, for example, a check status command that include a path to an executable file.

If process status checker 412 does not receive a satisfactory response from the target process, process status checker 412 can send the target process to abnormal process registry 414. Abnormal process registry 414 can maintain a current list of abnormal processes. The list can be dynamic. For example, a newly discovered abnormal process can be added the list. An abnormal process that has recovered (e.g., when a subsequent status check returns normal response) or an abnormal process that has been terminated (either manually or automatically) can be removed from the list.

Abnormal process registry 414 can maintain error counter 416 for each abnormal process. Error counter 416 can be incremented or decremented based on the status check for the abnormal process. For example, each abnormal response can increase error counter 416 by one. In some implementations, a response deemed "severe" can increase error counter 416 by a value more than one. For example, a response that includes an error code that indicates "fatal error" can directly set error counter 416 to a threshold value than can cause an immediate restart of the process, regardless of how many abnormal responses have been received before.

Once error counter 416 for the target process has reached a threshold, the target process is handed to process controller 418 for processing. Process controller 418 can determine processes that depend from the target process, and shut down and restart the dependent processes. To make the determination, process controller 418 can examine process database 428. Process database 428 can include a database entry or a configuration file.

Process controller 418 can shut down and restart the target process and the related processes through OS interface 426. Process controller 418 can also use OS interface 426 to communicate with a system logging process in order to write system logs. OS interface 426 can include, for example, start and stop commands that include paths to executable files.

Each component 410, 412, 414, and 418 can have a command line interface 402 (e.g., sa_cli), through which the components can receive command line instructions. Functions described above can be executed automatically or manually. To execute a function manually, a user can issue a command through command line interface 402. Some example commands are list below in Table 1.

TABLE 1

Exemplary Commands for Command Line Interface

| Command Line | Behavior |
| --- | --- |
| sa_cli start adminserver | Process control engine 400 can start administration server module 118 and monitor the process. |
| sa_cli stop adminserver | Process control engine 400 can start administration server module 118 and stop monitoring the process. |
| sa_cli restart adminserver | The restart command can be equivalent to using the stop and then the start command. |
| sa_cli autorestart adminserver | Command line interface 402 can return administration server module 118's auto-restart state (on or off). |
| sa_cli autorestart adminserver on | Process control engine 400 can turn off auto-restarting administration server module 118. |
| sa_cli autorestart adminserver off | Process control engine 400 can turn off auto restarting administration server module 118. Furthermore, administration server module 118 can be restarted if administration server module 118 has died or is not responding |

Figure 5A:
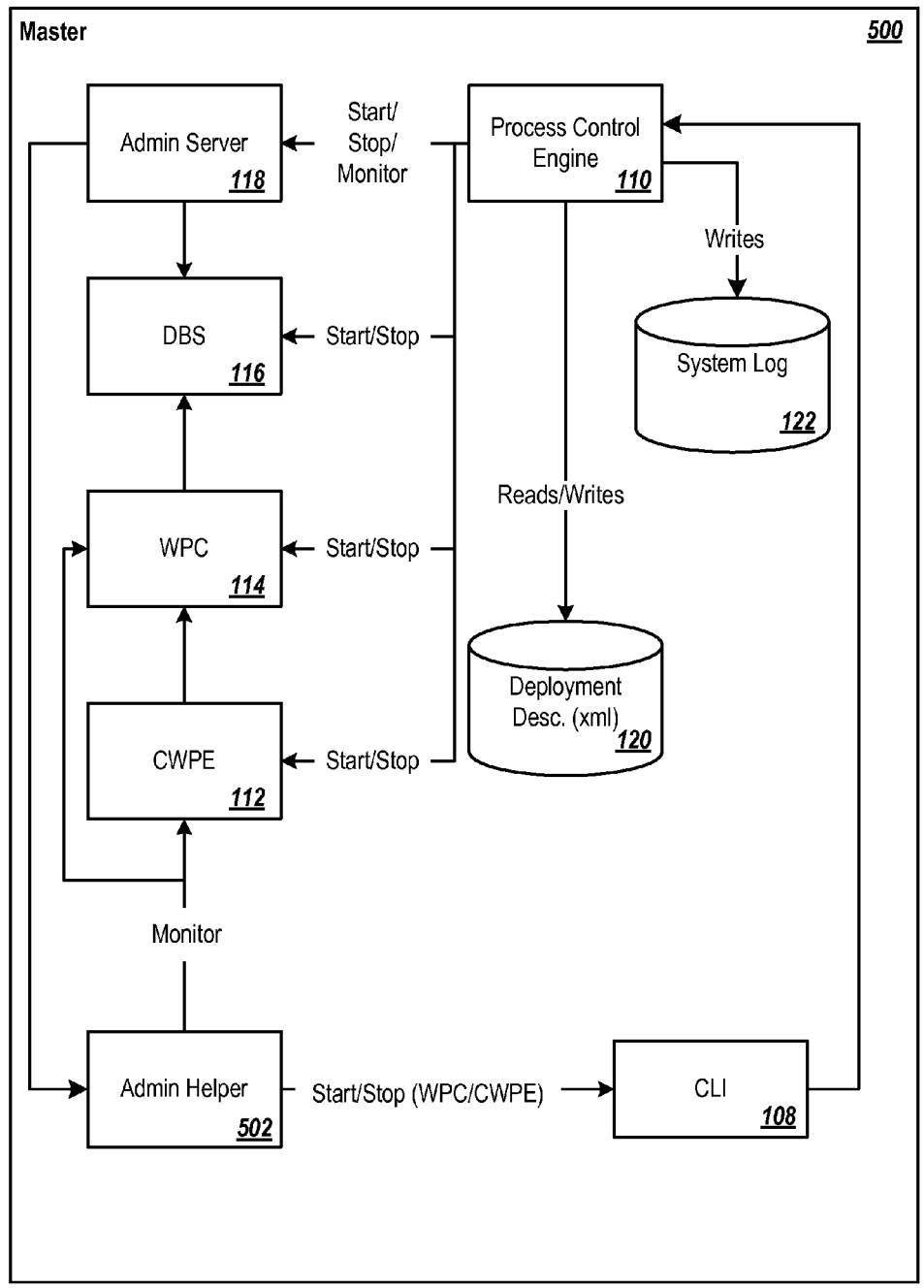
FIGS. 5A-5B illustrate exemplary systems for managing extrinsic processes on single computer and multi-computer settings.
Figure 5B:
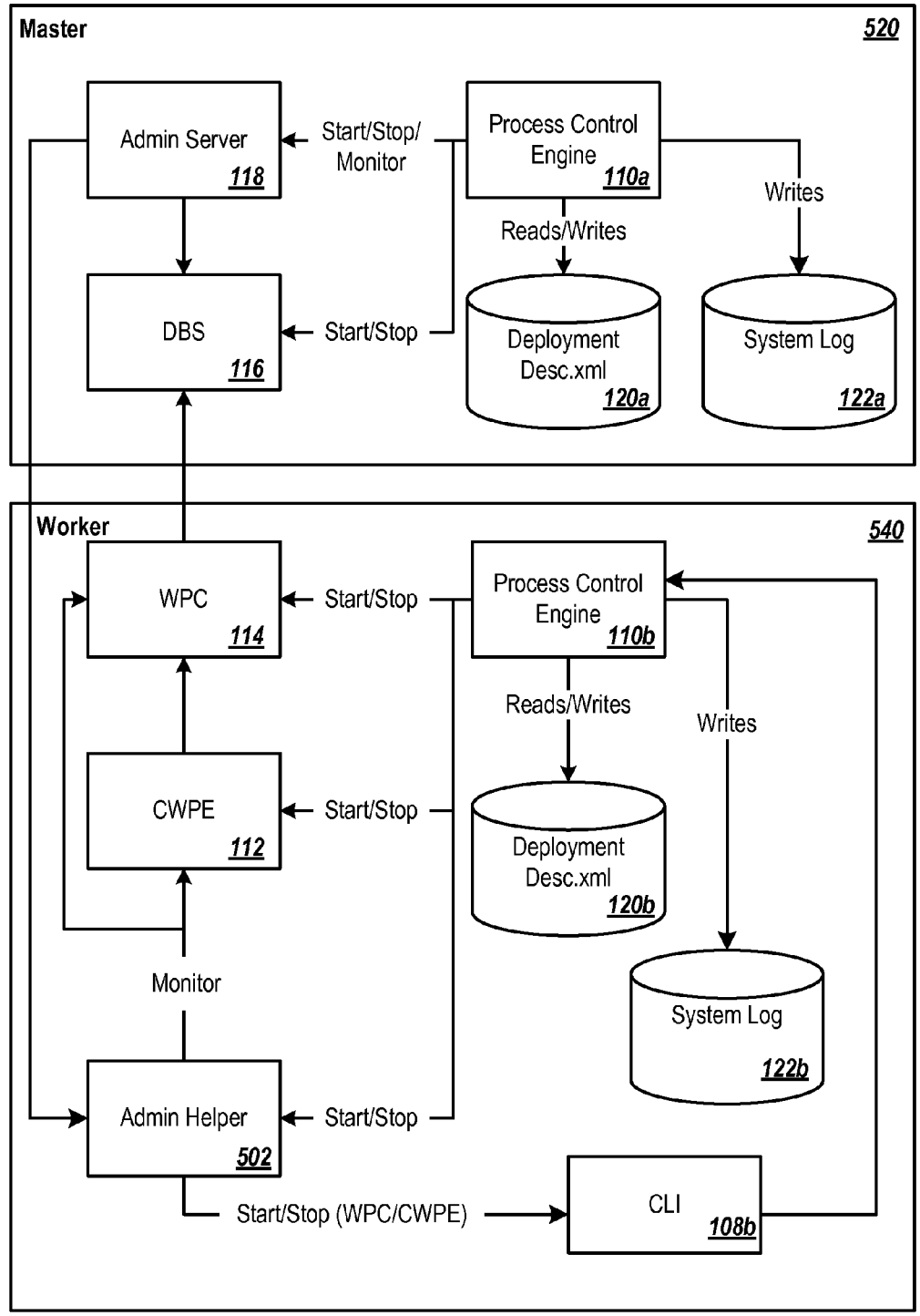

FIGS. 5A-5B illustrate exemplary systems for managing extrinsic processes on single computer and multi-computer settings. FIG. 5A illustrates an exemplary system 500 in which a monitoring process manages extrinsic processes on a single computer. Processes 112, 114, 116, and 118 can run on a computer. Administration server module 118 can manage processes 112 and 114 though administration helper 502. Administration helper 502, working in conjunction with administration server module 118, can start, stop, or monitor processes 112 and 114. Administration helper 502 can communicate with process control engine 110 through command-line interface 108. Process control engine 108 can write to process registry 120 and update status information on the various processes.

Process control engine 110 reads from process repository 120 to identify which processes to monitor. Based on the content in process repository 120, process control engine 110 can start or stop administration server module 118, DBS 116, WPC 114, and CWPE 112. Each time administration server module 118 starts or stops a process, one or more dependent processes can be started or stopped. In this example, administration server module 118 and WPC process 114 depend from DBS process 116, CWPE process 112 depends from WPC process 114. Administration server module 118 can write to system log 112 when a pre-determined event happens. Some exemplary events that can be logged are: a process has been started; a process has been stopped; administration server module 118 has become irresponsive; administration server module 118 has exited unexpectedly; and administration server module 118 has been disabled or enabled.

FIG. 5B illustrates an exemplary system in which a monitoring process manages extrinsic processes on multiple computers 520 and 540. Administration server module 118 can run on master computer 520. Administration server module 118 can manage processes 112 and 114 through administration helper 502, which can run on worker computer 540. Process control engine 110*a* can run on master computer 520 and monitor and manage administration server module 118 and DBS process 116. Process control engine 110*a* can read from process repository 120*a* to identify administration server module 118 and DBS process 116 to manage. Process control engine 110*a* can also write to process repository 120*a* when a user uses a command-line interface of process control engine 110*a* to start or stop administration server module 118 and DBS process 116. The status of and actions on administration server module 118 and DBS process 116 can be written to system log 122*a*.

A separate process control engine 110*b* can run on worker computer 130*b* and start or stop one or more WPC processes 114 and CWPE processes 112. Process control engine 110*b* can read from process repository 120*b* to identify which WPC processes 114 and CWPE processes 112 to manage. Administration helper 502 can run on worker computer 540, and communicate with administration server module 118 running on master computer 520. Administration helper 502 can communicate with process control engine 110*b* through command-line interface 108*b*. Process control engine 110*b* can write to process registry 120*b* and update status information on the various processes when administration helper 502 starts or stops a process. The status of and actions on CWPE process 112 and WPC process 114 can be written to system log 122*b*.

Exemplary System Architecture

Figure 6:
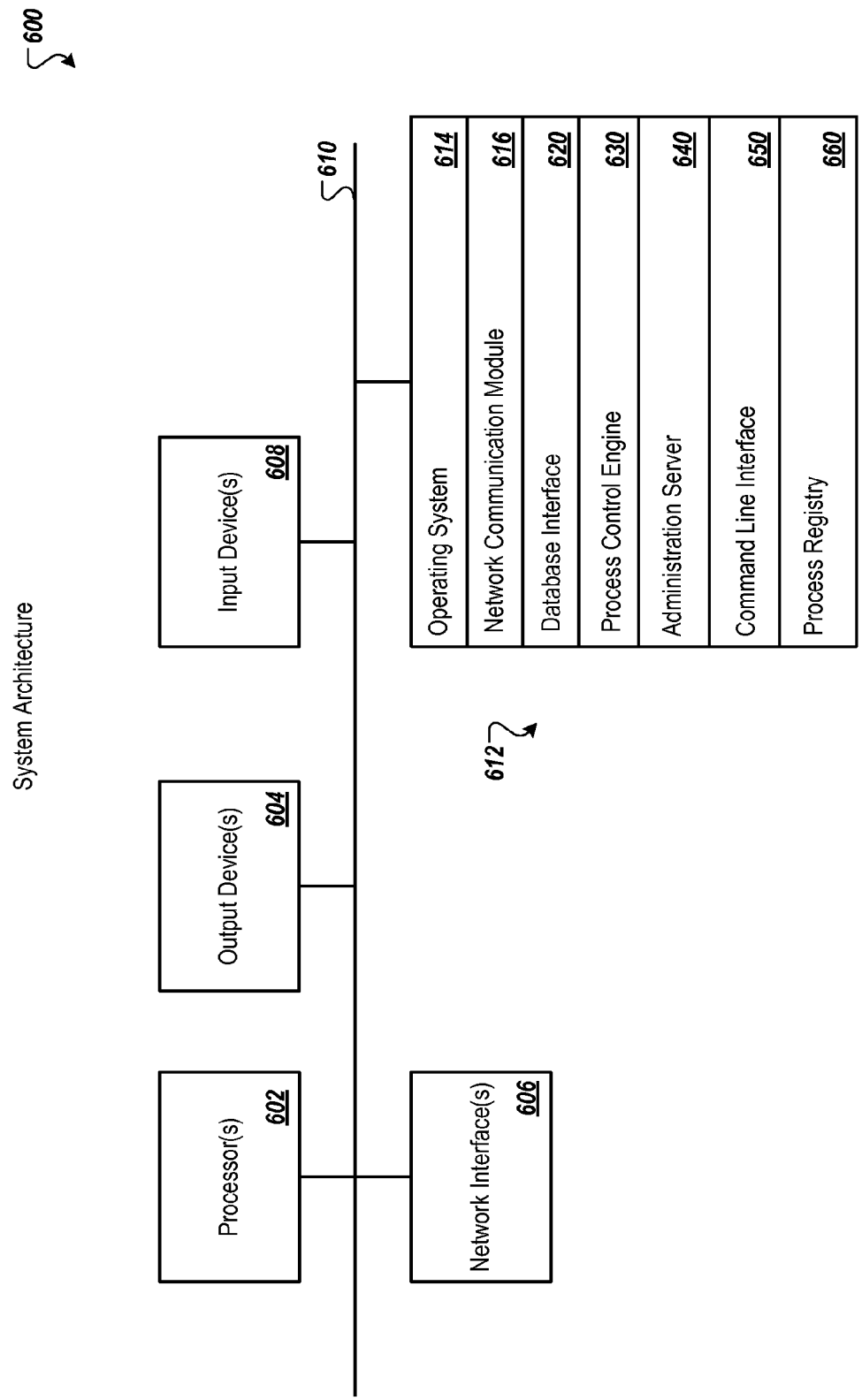
FIG. 6 is a block diagram of exemplary system architecture for implementing the features and operations described in reference to FIGS. 1-5.

FIG. 6 is a block diagram of exemplary system architecture 600 for implementing the features and operations described in reference to FIGS. 1-5. Other architectures are possible, including architectures with more or fewer components. In some implementations, architecture 600 includes one or more processors 602 (e.g., dual-core Intel® Xeon® Processors), one or more output devices 604 (e.g., LCD), one or more network interfaces 606, one or more input devices 608 (e.g., mouse, keyboard, touch-sensitive display) and one or more computer-readable mediums 612 (e.g., RAM, ROM, SDRAM, hard disk, optical disk, flash memory, etc.). These components can exchange communications and data over one or more communication channels 610 (e.g., buses), which can utilize various hardware and software for facilitating the transfer of data and control signals between components.

The term "computer-readable medium" refers to any medium that participates in providing instructions to processor 602 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 612 can further include operating system 614 (e.g., Mac OS® server, Windows® NT server), network communication module 616, database interface 620, process control engine 630, administration server 640, command-line interface 650, and process registry 660, as described in reference to FIGS. 1-5. Operating system 614 can be multi-user, multiprocessing, multitasking, multi-threading, real time, etc. Operating system 614 performs basic tasks, including but not limited to: recognizing input from and providing output to devices 606, 608; keeping track and managing files and directories on computer-readable mediums 612 (e.g., memory or a storage device); controlling peripheral devices; and managing traffic on the one or more communication channels 610. Network communications module 616 includes various components for establishing and maintaining network connections (e.g., software for implementing communication protocols, such as TCP/IP, HTTP, etc.). Process control engine 630 can include one or more functional components for monitoring extrinsic processes. Administration server 640 can include one or more functional components for controlling various processes. Process registry 660 can be a deployment description file that can include identifiers of currently running process and process dependency hierarchies.

Architecture 600 can be included in any device capable of hosting a database application program. Architecture 600 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations of the invention have been described. Nevertheless, it will be understood that various modifications can be made without departing from the spirit and scope of the invention. Accordingly, other implementations are within the scope of the following claims. For example, techniques for managing extrinsic processes are discussed. However, the techniques can be applied to intrinsic processes (e.g., processes spawned by the monitoring process) as well.

What is claimed is:

1. A computer-implemented method comprising:
identifying a first target process and a second target process using a monitoring process executing on one or more processors, including identifying, based on a respective tar associated with each of the first target process and the second target process, a dependency relationship in which the second target process depends from the first target process, wherein each of the first target process and the second target process is launched using a respective launch option of a Java application launcher, the launch option of each of the first target process and second target process being overloaded with the respective tag;
performing a status check on the first target process;
determining, based on the status check, that the first target process is in an abnormal state;
based on the dependency relationship, restarting the first target process using the monitoring process; and then restarting the second target process using the monitoring process.

2. The method of claim 1, wherein neither the first target process nor the second target process is a child of the monitoring process.

3. The method of claim 1, wherein identifying each of the first target process and the second target process comprises reading status information from a process registry.

4. The method of claim 1, wherein performing the status check includes:
making a status request to each of the first target process and the second target process;
checking status information in a response to each status request; and
determining that each of the first target process and the second target process is in an abnormal state if no status information is returned in response to a respective status request or the status information in response to a respective status request contains an error code.

5. The method of claim 1, comprising:
incrementing a failure count upon determining that the first target process is in an abnormal state; and
restarting the first target process occurs when the failure count reaches a threshold, wherein the threshold includes a number of failures.

6. A computer program product encoded on a non-transitory computer storage medium, operable to cause data processing apparatus to perform operations comprising:
identifying a first target process and a second target process using a monitoring process executing on one or more processors, including identifying, based on a respective tar associated with each of the first target process and the second target process, a dependency relationship in which the second target process depends from the first target process, wherein each of the first target process and the second target process is launched using a respective launch option of a Java application launcher, the launch option of each of the first target process and second target process being overloaded with the respective tag;
performing a status check on the first target process;
determining, based on the status check, that the first target process is in an abnormal state;
based on the dependency relationship, restarting the first target process using the monitoring process; and then restarting the second target process using the monitoring process.

7. The product of claim 6, wherein neither the first target process nor the second target process is a child of the monitoring process.

8. The product of claim 6, wherein identifying each of the first target process and the second target process comprises reading status information from a process registry.

9. The product of claim 6, wherein performing the status check includes:
making a status request to each of the first target process and the second target process;
checking status information in a response to the request; and
determining that each of the first target process and the second target process is in an abnormal state if no status information is returned in response to a respective status request or the status information in response to a respective status request contains an error code.

10. The product of claim 6, comprising:
incrementing a failure count upon determining that the first target process is in an abnormal state; and restarting the first target process when the failure count reaches a threshold, wherein the threshold includes a number of failures.

11. A system comprising:

one or more computers configured to perform operations comprising:

identifying a first target process and a second target process using a monitoring process executing on one or more processors, including identifying, based on a respective tar associated with each of the first target process and the second target process, a dependency relationship in which the second target process depends from the first target process, wherein each of the first target process and the second target process is launched using a respective launch option of a Java application launcher, the launch option of each of the first target process and second target process being overloaded with the respective tag;

performing a status check on the first target process;

determining, based on the status check, that the first target process is in an abnormal state;

based on the dependency relationship, restarting the first target process using the monitoring process; and then restarting the second target process using the monitoring process.

12. The system of claim 11, wherein neither the first target process nor the second target process is a child of the monitoring process.

13. The system of claim 11, wherein identifying each of the first target process and the second target process comprises reading status information from a process registry.

14. The system of claim 11, wherein performing the status check includes:

making a status request to each of the first target process and the second target process;

checking status information in a response to each status request; and determining that each of the first target process and the second target process is in an abnormal state if no status information is returned in response to a respective status request or the status information in response to a respective status request contains an error code.

15. The system of claim 11, comprising:

incrementing a failure count upon determining that the first target process is in an abnormal state; and restarting the first target process when the failure count reaches a threshold, wherein the threshold includes a number of failures.

16. The method of claim 1, wherein overloading each launch option comprises setting a system property value associated with a corresponding target process to the tag, the tag operable to indicate the dependency relationship.

17. The method of claim 16, wherein overloading each launch option comprises appending the tag with an appendix, the appendix operable to indicate an order in which the respective target process is launched.

18. The method of claim 1, wherein the first target process and second target process are not in a same process tree in which processes relate to one another through spawning.

19. The product of claim 6, wherein overloading each launch option comprises setting a system property value associated with a corresponding target process to the tag, the tag operable to indicate the dependency relationship.

20. The product of claim 19, wherein overloading each launch option comprises appending the tag with an appendix, the appendix operable to indicate an order in which the respective target process is launched.

21. The product of claim 6, wherein the first target process and second target process are not in a same process tree in which processes relate to one another through spawning.

22. The system of claim 11, wherein overloading each launch option comprises setting a system property value associated with a corresponding target process to the tag, the tag operable to indicate the dependency relationship.

23. The system of claim 22, wherein overloading each launch option comprises appending the tag with an appendix, the appendix operable to indicate an order in which the respective target process is launched.

24. The system of claim 11, wherein the first target process and second target process are not in a same process tree in which processes relate to one another through spawning.

* * * * *

UNITED STATES PATENT AND TRADEMARK OFFICE
CERTIFICATE OF CORRECTION

| | | |
|---|---|---|
| PATENT NO. | : 8,239,709 B2 | |
| APPLICATION NO. | : 12/540254 | |
| DATED | : August 7, 2012 | |
| INVENTOR(S) | : Erwin Hom et al. | |

It is certified that error appears in the above-identified patent and that said Letters Patent is hereby corrected as shown below:

In the claims:

Column 17, Line 54, In Claim 1, delete "tar" and insert -- tag --

Column 18, Line 23, In Claim 5, delete "occurs when" and insert -- when --

Column 18, Line 32, In Claim 6, delete "tar" and insert -- tag --

Column 19, Line 10, In Claim 11, delete "tar" and insert -- tag --

Signed and Sealed this
Twenty-seventh Day of November, 2012

David J. Kappos
*Director of the United States Patent and Trademark Office*